United States Patent
Byrne

(10) Patent No.: US 12,401,676 B2
(45) Date of Patent: Aug. 26, 2025

(54) SYSTEMS AND METHODS FOR PERFORMING AN EXTERNAL VULNERABILITY SCAN USING EXTERNAL INTERNET PROTOCOL ADDRESSES

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 186 days.

(21) Appl. No.: 18/468,584

(22) Filed: Sep. 15, 2023

(65) Prior Publication Data
US 2025/0097250 A1 Mar. 20, 2025

(51) Int. Cl.
*H04L 9/40* (2022.01)
(52) U.S. Cl.
CPC ...... *H04L 63/1433* (2013.01); *H04L 63/1425* (2013.01); *H04L 63/20* (2013.01)
(58) Field of Classification Search
CPC .. H04L 63/1433; H04L 63/1425; H04L 63/20
See application file for complete search history.

(56) References Cited

U.S. PATENT DOCUMENTS

| | | | |
|---|---|---|---|
| 6,768,743 B1* | 7/2004 | Borella | H04L 61/2564 370/475 |
| 9,160,809 B2* | 10/2015 | Carney | H04L 45/00 |
| 2007/0097976 A1* | 5/2007 | Wood | H04L 63/1416 370/392 |
| 2010/0046530 A1* | 2/2010 | Hautakorpi | H04L 61/59 370/401 |
| 2010/0322237 A1* | 12/2010 | Raja | H04L 63/1433 370/389 |
| 2015/0188949 A1* | 7/2015 | Mahaffey | H04W 12/03 726/1 |
| 2017/0006113 A1* | 1/2017 | Singhal | H04L 67/141 |
| 2019/0036911 A1* | 1/2019 | Bell | H04L 63/1433 |

OTHER PUBLICATIONS

Ahmed et al. (IPv6 Neighbor Discovery Protocol Specifications, Threats and Countermeasures: A Survey, IEEE 2017, pp. 18187-18210) (Year: 2017).*

* cited by examiner

*Primary Examiner* — Oleg Korsak
(74) *Attorney, Agent, or Firm* — Lee & Hayes, P.C.

(57) ABSTRACT

System and methods for external vulnerability scanning a network are described. When a user equipment is attached to a network, the network provides information about the user equipment to a lookup table. In some examples, the lookup table is maintained by a network, such as mobile network, that facilitates packet-based communications between the user equipment to devices on the Internet. A scanner that performs the external vulnerability scan is provided information stored in the lookup table. The scanner returns the results of the scan to the mobile network.

20 Claims, 5 Drawing Sheets

SYSTEMS AND METHODS FOR PERFORMING AN EXTERNAL VULNERABILITY SCAN USING EXTERNAL INTERNET PROTOCOL ADDRESSES

BACKGROUND

When supporting various types of networks, such as enterprise networks, it may be beneficial to scan the network for potential security issues. There are various types of security scans including, but not limited to, internal scans, port scans, external scans, network security scans, and environmental scans. Specific scans may include virus/malware scans, network port scans, penetration tests, rogue access point scans, program bug scans, vulnerability scans, and user permission-level scans. Network administrators and organizations often perform one or more of these scans periodically to identify and reduce the probability of vulnerabilities in a network. These vulnerabilities may be exploited by unknown entities (e.g., hackers) to retrieve sensitive proprietary data or to introduce software into the network that can be used for illicit purposes.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
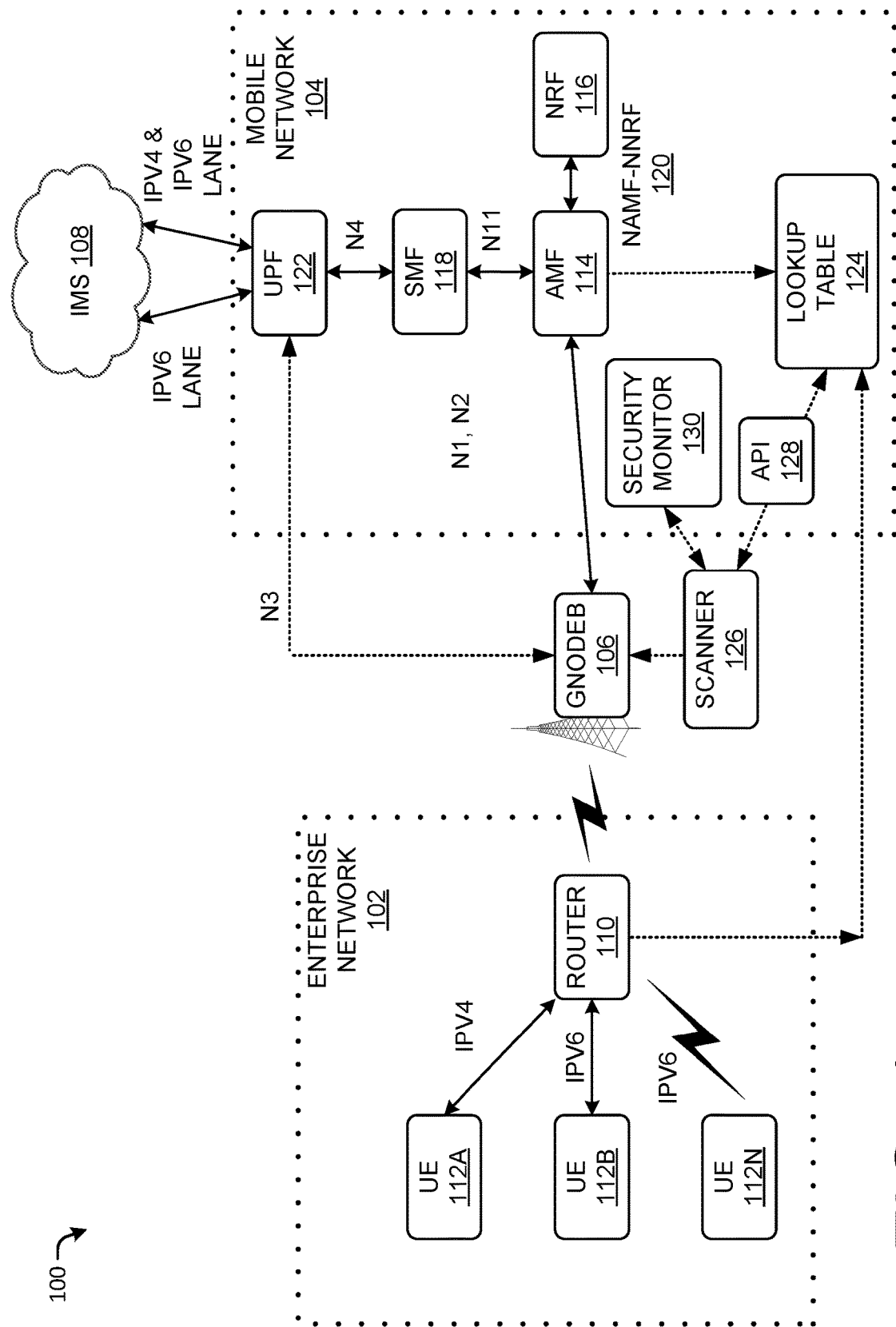
FIG. 1 is a schematic diagram of an illustrative wireless communication network environment in which systems and techniques for scanning user equipment are implemented, in accordance with examples of the disclosure.

This disclosure is directed in part to systems and techniques for security scanning a network using a lookup table. A lookup table is used by a scanner to perform a targeted, external scan of one or more devices of a network, such as a local area network (LAN), wide area network (WAN), a virtual private network (VPN), and the like. An external scan of a network tests vulnerabilities of a network by accessing the network infrastructure and components from a communication node outside of the network, e.g., beyond a network's firewall, router, or other device acting as an access to the network. In conventional systems, these types of scans are often done in a random or semi-random nature, whereby a scanner probes a network using randomly generated internet protocol (IP) addresses, attempting to find a device to probe.

When the number of available IP addresses is relatively small, such as 32-bit address used for IP version 4 (IPv4) devices, often the scanner can randomly generate IP addresses to probe for IPV4 devices to perform a security scan. However, as technology has advanced, some devices have IP addresses that are significantly longer, such as IPv6 devices. IPV6 is a communication protocol that uses an address space of 128 bits. Scanning for IPV6 devices using a random number generator (or other technology to generate IP addresses to probe) can be problematic and place a significant strain on computing resources. For example, because of the longer length of address spaces, the probability that the scanner will generate a number that corresponds to an IPV6 device is significantly less than the probability that the scanner will generate a number that corresponds to an IPV4 device. This means that the scanner will have to perform a greater number of probes to find IPv6 devices, resulting in increased taxing of resources and use of communication bandwidth, as well as, potentially overwhelming a network firewall. Further, in the same manner, the chances of finding a device with a long address space is significantly lower, meaning that security scans can become less effective and fail to find potential security vulnerabilities.

Various examples of the presently disclosed subject matter use a lookup table to provide a scanner with IP addresses of devices to probe. When a device is brought online by a router serving the network, a router or other device in the network provides the IP address of the device brought onto the network to network that implements the scanning operation, such as mobile cellular network. The IP address and other information about the device brought online may be obtained using various protocols, such as a neighbor discovery protocol (NDP). The main function of a NDP is the resolution of IPV6 addresses into valid MAC addresses, the respective devices' underlying hardware address. In IPV4, this function takes the Address Resolution Protocol (ARP). All determined addresses are stored as information in the neighbor cache. This buffer not only informs network users about the local addresses of the neighboring clients, but also supplies them with additional information required for the availability check. When performing a probe, the scanner is provided access to the lookup table and probes the network using the IP addresses provided in the lookup table.

The scanner may probe based on various triggers (prompts). For example, the network implementing the scanning operation may notify the scanner that a new device, such as an IPV6 device, has been brought onto a network and provide the IP address to probe. The scanner may then use that information to probe for the device. In another example, the scanner may periodically probe the lookup table for new devices not previously probed. The scanner downloads those IP addresses, probes the devices, and then updates the lookup table to indicate that the one or more devices not previously probed have now been probed. In other examples, the scanner may access the lookup table and find devices that have not been probed for a certain period of time. After probing, the scanner may then update the lookup table. These and other examples are considered to be within the scope of the presently disclosed subject matter.

Illustrative environments, signal flows, and techniques for implementing systems and methods are described below. However, the described systems and techniques may be implemented in other environments.

Illustrative System Architecture

FIG. 1 is a schematic diagram of an illustrative wireless network environment 100 in which the disclosed systems and techniques may be implemented, in accordance with examples of the disclosure. The environment 100 may include an enterprise network 102 and a mobile network 104. The enterprise network 102 may be a network having one or more wired or wireless devices using the resources of the enterprise network 102. The mobile network 104 may include various types of networks that support the communication between one or more devices using cellular network systems. The mobile network 104 may be one or more mobile telecommunication networks that facilitate communications between devices of various types, such as computing device and mobile devices (e.g., UEs). Various connections between devices in the mobile network 104 may be wired, wireless, or a combination thereof. The mobile network 104 may facilitate packet-based communications between devices in the enterprise network 102 and device on the Internet and/or one or more IMSs, such as IP multimedia system or subsystem (IMS) 108.

The mobile network 104 may include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with network and/or remote devices using any protocol. A device in the enterprise network 102 may access the IMS 108 using protocols such as IPv4 and IPV6. A request for an IPV4v6 communications connection from the device (also known as a "dual stack" connection) may indicate that the device supports both IPV4 and IPV6. Such a device may prefer to use IPV6 but is able to use IPV4 in the event that an IPv6 connection is not available.

Communication between the enterprise network 102 and the mobile network 104 may be provided through the use of one or more base stations, represented in FIG. 1 by gNodeB 106. While referred to as a "gNodeB" for explanatory purpose herein, the gNodeB 106 may be any type of base station, including, but not limited to, any type of base transceiver station (BTS), NodeB, eNodeB, gNodeB, and the like. The gNodeB 106 may communicate with other devices and elements in the core of the mobile network 104. The gNodeB 106 communicates with a router 110 in the enterprise network 102 to provide communicates to and from the IMS 108 for devices accessing the IMS 108.

The enterprise network 102 includes user equipment (UE) 112A-112N (hereinafter referred to generically as "the UE 112," and individually as "the UE 112A," "the UE 112B," and "the UE 112N"). The UE 112 are devices that are configured to communicate wirelessly or through a wired connection to the router 110 using various communication protocols. For example, the UE 112A is a wired connection that has been brought onto the enterprise network 102 by the router 110 and assigned an IP address space for IPV4 communications. The UE 112B is a wired connection that has been brought onto the enterprise network 102 by the router 110 and assigned an IP address space for IPV6 communications. The UE 112N is a wireless connection that has been brought onto the enterprise network 102 by the router 110 and assigned an IP address space for IPV6 communications. The UE 112 may be computers, servers, tablets, smartphones, mobile telephones, and other computing devices capable of and configured to communicate with the router 110.

Once the UE 112 has been brought up onto the enterprise network 102 by the router 110, the UE 112 can access services provided by the IMS 108 through the router 110 and the gNodeB 106 by establishing a protocol data unit (PDU) session at the mobile network 104. A PDU session, for example in a 5G network, may be an end-to-end communications session between a device (e.g., the UE 112) and a data network (e.g., the IMS 108). The gNodeB 106 may relay or otherwise convey this PDU session request from the UE to an access management function (AMF) 114 in the core of the wireless network in which the gNodeB is configured. The AMF 114 may interact with one or more other components to perform the operations needed to establish this session, such as authenticating the device and/or user, registering the UE 112 with the mobile network 104.

The AMF 114, based on receiving this request for the establishment of a PDU, i.e., an IPV4-type or IPv6-type session on behalf of the UE 112, may query an NRF 116 for an address (e.g., IP address) for a session management function (SMF) 118 with which it may interact to establish the requested PDU session. The AMF 114 may exchange SMF discovery communications 120 (Namf-Nnrf), which may be called an SMF address request in some examples, with the NRF 116. The NRF 116 returns the identifier of the SMF 118 for use by the AMF 114. Thereafter, the AMF 114 sends a connection request N11 to the selected SMF 118. In examples, the SMF 118 may provide the access information needed by the UE 112 to communicate with a data network using the established session. The SMF 118 provides this information to the AMF 114 for relay to the gNodeB and ultimately to the UE 112 requesting the PDU session. In 5G examples, a message that provides such information may be referred to as a "NIN2MessageTransfer." These and other messages communicating similar information may be referred to generally herein as a "message transfer" messages. The SMF 118 further establishes a connection to its coordinating user plane function (UPF) 122 through an N4 interface, which facilitates communications between the UE 112 and the IMS 108. The SMF 118 instantiates a connection N3 from the gNodeB 106 to the UPF 122 to provide a communication path between the UE 112, through the router 110, and from the gNodeB 106, to and from the IMS 108 through either the IPV6 or the IPV4&IPv6 lane.

When one of the UEs 112 connect to the router 110, the router 110 assigns the UE 112 an IP address to which the UE 112 sends and receives data to and from the IMS 108. If the UE 112 is a device that uses the IPV4 protocol, the UE 112 is assigned an IP address in an address space associated with IPv4 communication protocols. If the UE 112 is a device that uses the IPV6 protocol, the UE 112 is assigned an IP address in an address space associated with IPV6 communication protocols. When the UE 112, such as the UE 112B, is assigned an address space associated with IPV6 communication protocols, the address space assigned is provided to a lookup table 124 of the mobile network 104.

The lookup table 124 is a data store used to store, among other data, address spaces (including external IP addresses) assigned by one or more enterprise networks 102 to the user equipment in the enterprise networks 102. The lookup table 124 may also store other data such as, but not limited to, a geographic region of the UE 112B, a geographic region of the enterprise network 102, a date/time when the UE 112B was assigned an IP address, a media access control (MAC) address, and the like. The lookup table 124 can further be updated by the router 110 when the UE 112B is assigned an IP address (brought onto the enterprise network 102). In some examples, as part of the operations of the router 110, when a UE such as the UE 112B is brought onto the enterprise network 102, the router 110 can perform a neighbor discovery protocol (NDP) operation. In some examples, in the case the IPV4 UEs, the router 110 can perform the address resolution protocol (ARP). The presently disclosed subject matter is not limited to any particular protocol. The data created by the router 110 can be used to update the lookup table 124.

The lookup table 124 is used by a scanner 126 to attempt to detect one or more security vulnerabilities in the enterprise network 102. Some types of security vulnerabilities include, but are not limited to, misconfiguration of a UE, outdated or unpatched software, unauthorized access, unsecured application programming interfaces (APIs), zero-day vulnerabilities, stolen or weak user credentials, and the like. The scanner 126 may be implemented or controlled by the mobile network 104 or may be a third-party service provided to and used by the mobile network 104. The presently disclosed subject matter is not limited to any particular configuration.

The scanner 126 is triggered when a security scan is desired. The trigger in response may vary, but may include, when a device is brought onto the enterprise network 102, a period of time has elapsed since the last scanning operation, an input by the mobile network 104 requesting a security scan, a prompt by a security monitor 130, and the like. When the scanner 126 is triggered, the scanner 126 accesses the lookup table 124 through an application programming interface (API) 128. In some examples, the scanner 126 may have stored in a memory of the scanner 126 the lookup table 124 or may be able to access the lookup table 124 without the need for the use of the API 128. Thus, the presently disclosed subject matter is not limited to the use of the API 128, as the scanner 126 may have access to the data in the lookup table 124 using other means or technology.

The scanner 126 retrieves data for a scan from the lookup table 124 and uses that data to perform an external vulnerability scan on the enterprise network 102. In some examples, an external vulnerability scan involves scanning external IP addresses and domains to probe for vulnerabilities in Internet-facing infrastructure to determine possible exploits. In some other examples, the external vulnerability scans a target IP address to scan for perimeter defenses such as websites, web applications, and network firewalls. As noted above, rather than randomly selecting potential IPV6 address spaces used by the UEs 112 in the enterprise network 102, the scanner 126 uses the IP address for the UE 112B provided by, or stored in, the lookup table 124. In some examples, the scanner 126 may perform various types of external security scans depending on the particular configuration of the scanner 126. The scan information generated by the scanner 126 is provided to the security monitor 130. The security monitor 130 may be implemented by the mobile network 104 or may be a service provided by a third-party. The security monitor 130 may provide the scan information to the mobile network 104, the enterprise network 102, or another entity depending on the particular configuration of the security monitor.

Illustrative Operations

Figure 2:
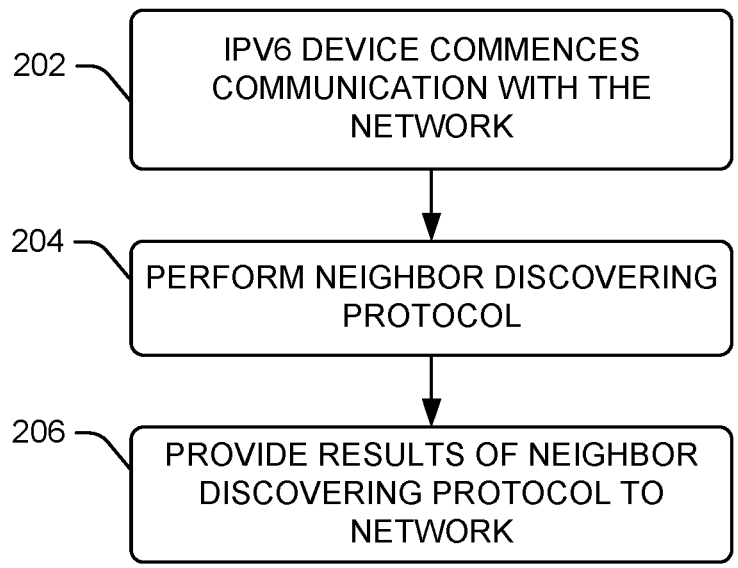
FIG. 2 is a flow diagram of an illustrative process for updating a lookup table, in accordance with examples of the disclosure.

FIG. 2 shows a flow diagram of an illustrative process 200 for updating the lookup table 124, in accordance with examples of the disclosure. The process 200, including the process 300 described below, is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 200 may be described with reference to the wireless network environment 100 of FIG. 1, however other environments may also be used. Further, although the processes 200 and 300 may be described in terms of IPv6 devices, the presently disclosed subject matter may be used with other types of communication protocols, including, but not limited to, IPv4.

At block 202, an IPV6 device, such as the UE 112N of FIG. 1, commences communicating with the enterprise network 102. The UE 112N may commence communicating using various means, such as connecting to Wi-Fi provided by the enterprise network 102, physically connecting an ethernet cable, such as a CAT6 cable, to an ethernet port connected to the enterprise network 102, and the like.

At block 204, the router 110 commences NDP to bring the UE 112N onto the network. It should be noted that other technologies for bringing the UE 112N onto the enterprise network 102 may be used, such as address resolution protocol and Internet control message protocol, and are considered to be within the scope of the presently disclosed subject matter. Generally, the NDP includes the processes of router advertisement, router solicitation, neighbor solicitation, neighbor advertisement, and redirects. In some examples, the IP address in the MAC address is resolved using the NDP.

At block 206, the results of the NDP are provided to the lookup table 124 of the mobile network 104. As noted above, the lookup table 124 may store the IP address of the UE 112N, the time the NDP process was completed for the UE 112N, neighbor IP addresses of the UE 112N, and the like. The lookup table 124 may also store the last time the UE 112N was scanned if the UE 112N was previously attached to the enterprise network 102, and other information. The information in the lookup table 124 is used by the scanner 126 to scan one or more components of the enterprise network 102 to search for security vulnerabilities, described in FIG. 3, below.

Figure 3:
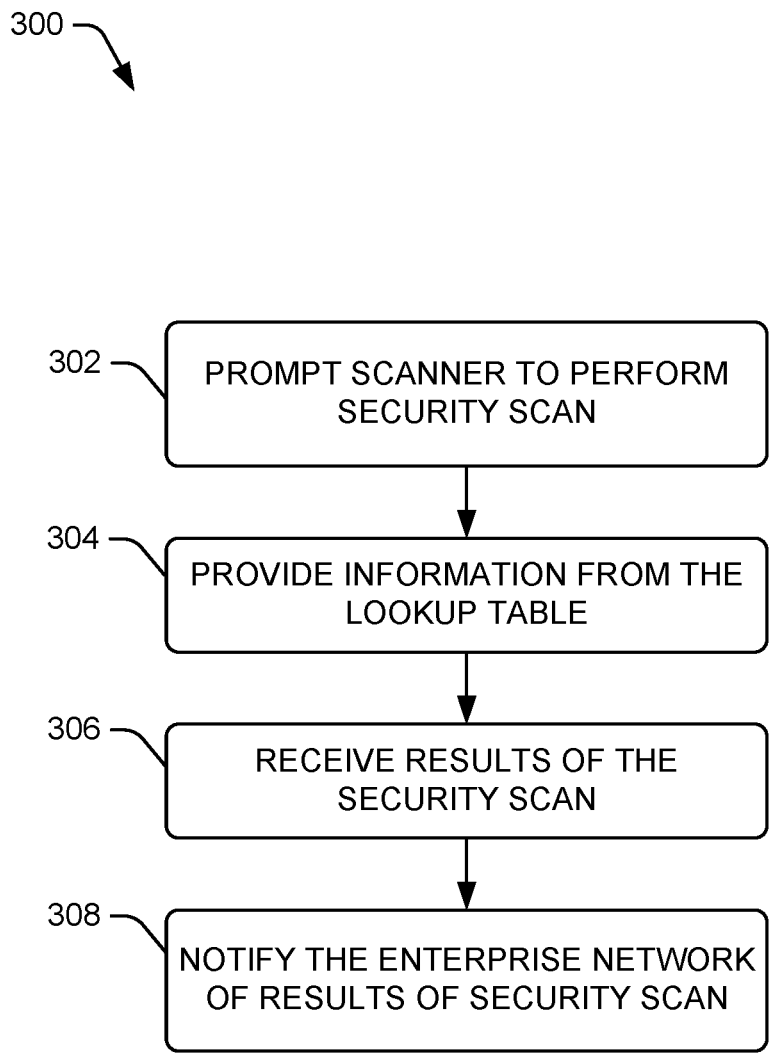
FIG. 3 is a flow diagram of an illustrative process for scanning a user equipment, in accordance with examples of the disclosure.

FIG. 3 shows a flow diagram of an illustrative process 300 for scanning a user equipment, in accordance with examples of the disclosure.

The process 300 commences at block 302, where the mobile network 104 prompts the scanner 126 to perform a security scan on the UE 112N. In this example, the prompt is generated when the lookup table 124 is updated by the router 110 when the UE 112N is attached to the enterprise network 102. However, as noted above, the mobile network 104 may prompt the scanner 126 for other reasons such as a period of time has elapsed between scans. The presently disclosed subject matter is not limited to any particular reason that the scanner 126 is prompted. Further, the prompt may be generated from other sources, such the router 110 providing a notice to the scanner 126 that the router 110 has attached the UE 112N to the enterprise network 102.

At block 304, information stored in the lookup table 124 is provided to the scanner 126. The information may include the external IP address of the one or more UEs to be scanned, such as the UE 112N. It should be noted that the scanner 126 may not be prompted each time a UE, such as the UE 112N of the present example, is attached to the enterprise network 102. For example, the scanner 126 may be prompted at a certain time of the day to scan UEs attached to the enterprise network 102 in the prior twenty four hour period (batch processing), may be prompted to scan after a certain number of UEs have been attached, and/or may be prompted to scan after a certain period of time (such as every two hours). These and other techniques may be used to reduce bandwidth or perform scans during times in which the enterprise network 102 may not be used to a high degree, such as a time period during which workers that may use the enterprise network 102 may not be working.

At block 306, the mobile network 104 may receive the results of the security scan from the scanner 126. The results may include the UEs scanned, any vulnerabilities detected, the time of the scan, and the like.

At block 308, the mobile network 104 may notify one or more entities, such as the enterprise network 102, of the results of the scan. These results may be used by the enterprise network 102 to maintain the security of the enterprise network 102.

Example User Equipment

Figure 4:
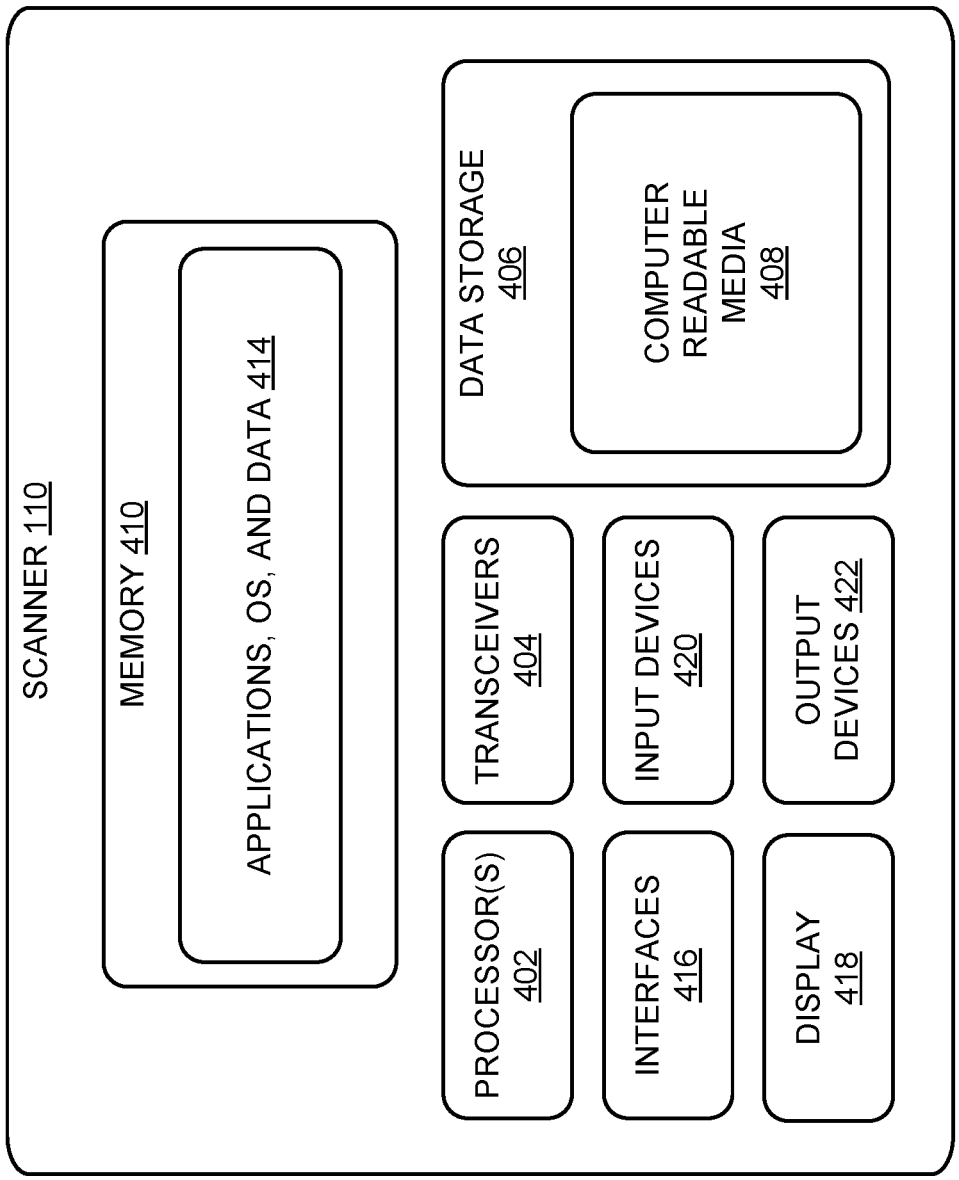
FIG. 4 is a schematic diagram of illustrative components in an example user device that is configured for scanning a user equipment, in accordance with examples of the disclosure.

FIG. 4 is an example of a scanner, such as the scanner 126, for use with the systems and methods disclosed herein, in accordance with some examples of the present disclosure. The scanner 126 may include one or more processors 402, one or more transmit/receive antennas (e.g., transceivers or transceiver antennas) 404, and a data storage 406. The data storage 406 may include a computer readable media 408 in the form of memory and/or cache. This computer-readable media may include a non-transitory computer-readable media. The processor(s) 402 may be configured to execute instructions, which can be stored in the computer readable media 408 and/or in other computer readable media accessible to the processor(s) 402. In some configurations, the processor(s) 402 is a Central Processing Unit (CPU), a Graphics Processing Unit (GPU), or both CPU and GPU, or any other sort of processing unit. The transceiver antenna(s) 404 can exchange signals with a base station, such as gNodeB 106.

The scanner 126 may be configured with a memory 410. The memory 410 may be used to store data received from the lookup table 124. The memory 410 may be implemented within, or separate from, the data storage 406 and/or the computer readable media 408. The memory 410 may include any available physical media accessible by a computing device to implement the instructions stored thereon. For example, the memory 410 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information, and which may be accessed by the scanner 126.

The memory 410 can store several modules, such as instructions, data stores, and so forth that are configured to execute on the processor(s) 402. In configurations, the memory 410 may also store one or more applications 414 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the gNodeB 106). The applications 414 may further include applications to retrieve data from the lookup table 124 as well as provide scanning data to the mobile network 104. The applications 414 may also include one or more operating systems and/or one or more third-party applications that provide additional functionality to the scanner 126.

Although not all illustrated in FIG. 4, the scanner 126 may also comprise various other components, e.g., a battery, a charging unit, one or more network interfaces 416, an audio interface, a display 418, a keypad or keyboard, and one or more input devices 420, and one or more output devices 422.

Example Computing Device

Figure 5:
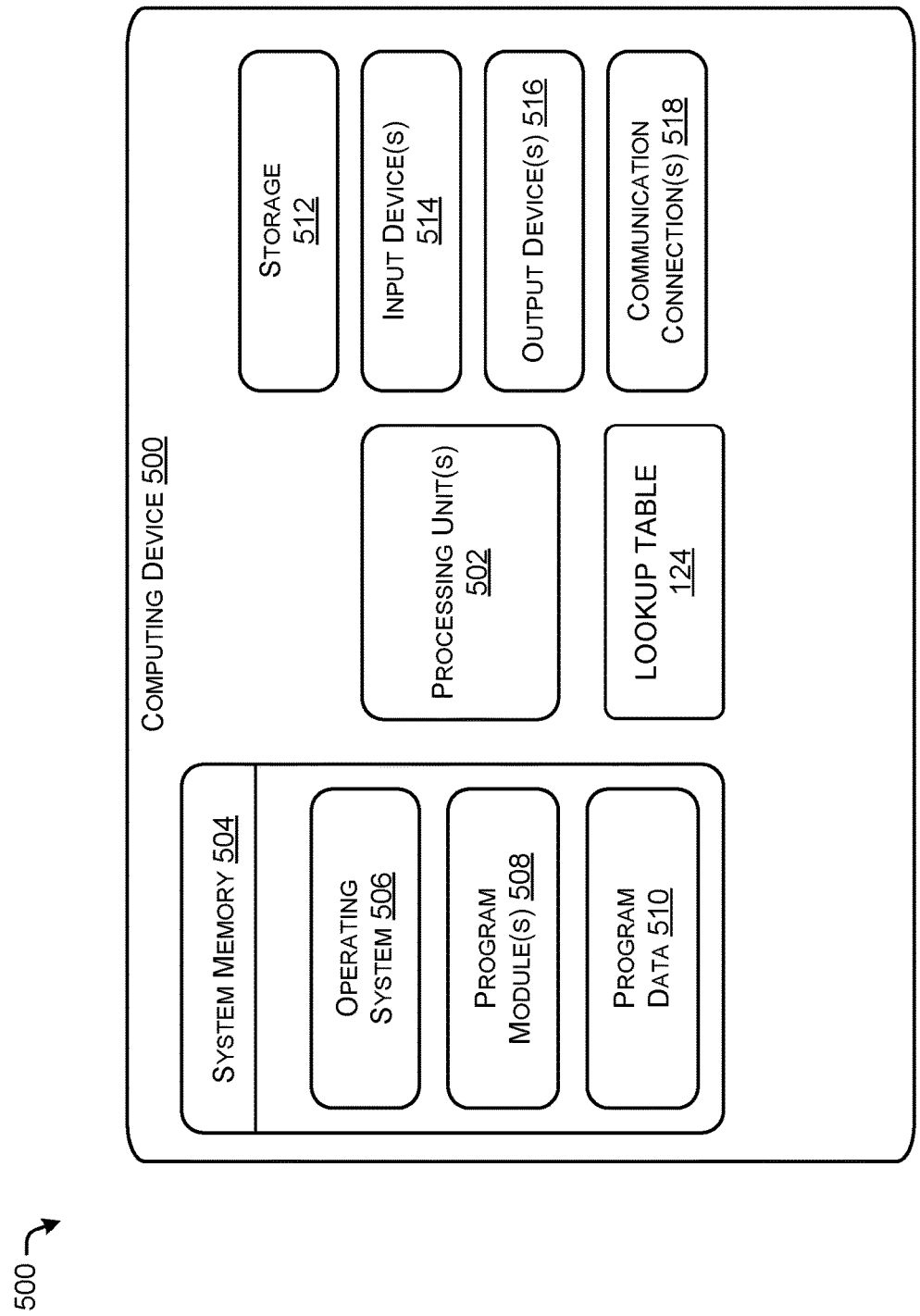
FIG. 5 is a schematic diagram of illustrative components in an example computing device that is configured for scanning a user equipment, in accordance with examples of the disclosure.

FIG. 5 is an example of a computing device 500 for use with the systems and methods disclosed herein, in accordance with some examples of the present disclosure. The computing device 500 can be used to implement various components of a core network, a base station, and/or any servers, routers, gateways, gateway elements, administrative components, etc. that can be used by a communication provider. The computing device 500 can further be used to implement the security monitor 130 and/or the lookup table 124.

In various embodiments, the computing device 500 can include one or more processing units 502 and system memory 504. Depending on the exact configuration and type of computing device, the system memory 504 can be volatile (such as RAM), nonvolatile (such as ROM, flash memory, etc.) or some combination of the two. The system memory 504 can include an operating system 506, one or more program modules 508, and can include program data 510. The system memory 504 may be secure storage or at least a portion of the system memory 504 can include secure storage. The secure storage can prevent unauthorized access to data stored in the secure storage. For example, data stored in the secure storage can be encrypted or accessed via a security key and/or password. The program modules can include instructions to execute the lookup table 124 of FIG. 1.

The computing device 500 can also include additional data storage devices (removable and/or non-removable) such as, for example, magnetic disks, optical disks, or tape. Such additional storage is illustrated in FIG. 5 by storage 512.

Non-transitory computer storage media of the computing device 500 can include volatile and nonvolatile, removable and non-removable media implemented in any method or technology for storage of information, such as computer readable instructions, data structures, program modules, or other data. The system memory 504 and storage 512 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by computing device 500. Any such non-transitory computer readable storage media can be part of the computing device 500.

In various embodiment, any or all of the system memory 504 and storage 512 can store programming instructions which, when executed, implement some or all of the functionality described above as being implemented by one or more systems configured in the environment 100 and/or components of the mobile network 104.

The computing device 500 can also have one or more input devices 514 such as a keyboard, a mouse, a touch-sensitive display, voice input device, etc. The computing device 500 can also have one or more output devices 516 such as a display, speakers, a printer, etc. can also be included. The computing device 500 can also contain one or more communication connections 518 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A: All methods, systems, and apparatuses, including all equivalents, disclosed.

Clause 1. A method, comprising: receiving, at a first network, an Internet protocol (IP) address of a user equipment attached to a second network; updating a lookup table, wherein the lookup table comprises the IP address of the user equipment; prompting a scanner to perform a scanning operation on the second network using the IP address of the user equipment; providing the scanner with the IP address of the user equipment from the lookup table; and receiving results of the scanning operation.

Clause 2. The method of clause 1, wherein the IP address of the user equipment is provided by a router servicing the second network.

Clause 3. The method of any of clauses 1-2, wherein the router servicing the second network performs a neighbor discovery protocol to provide the IP address of the user equipment.

Clause 4. The method of any of clauses 1-3, wherein prompting the scanner to perform the scanning operation on the second network using the IP address of the user equipment is done in response to the first network receiving an update to the lookup table from the second network indicating that the user equipment has been attached to the second network.

Clause 5. The method of any of clauses 1-4, wherein prompting the scanner to perform the scanning operation on the second network using the IP address of the user equipment is done in response to a period of time elapsing between a prior scanning operation and the scanning operation.

Clause 6. The method of any of clauses 1-5, wherein the IP address is associated with an address space for IPV6 communication protocols.

Clause 7. The method of any of clauses 1-6, further comprising providing the results of the scanning operation to the second network.

Clause 8. The method of any of clauses 1-7, wherein the scanning operation comprises scanning the IP address to probe for vulnerabilities to determine a possible exploit.

Clause 9. The method of any of clauses 1-8, wherein the lookup table further comprises a geographic region of the user equipment, a geographic region of the second network, a date/time when the user equipment was assigned the IP address, and a media access control (MAC) address of the user equipment.

Clause 10. A non-transitory computer-readable media storing computer-executable instructions that, when executed by one or more processors, cause the one or more processors to perform operations comprising: receiving, at a first network, an Internet protocol (IP) address of a user equipment attached to a second network; updating a lookup table, wherein the lookup table comprises the IP address of the user equipment; prompting a scanner to perform a scanning operation on the second network using the IP address of the user equipment; providing the scanner with the IP address of the user equipment from the lookup table; and receiving results of the scanning operation.

Clause 11. The non-transitory computer-readable media of clause 10, wherein the IP address of the user equipment is provided by a router servicing the second network.

Clause 12. The non-transitory computer-readable media of any of clauses 10-11, wherein the router servicing the second network performs a neighbor discovery protocol to provide the IP address of the user equipment.

Clause 13. The non-transitory computer-readable media of any of clauses 10-12, wherein prompting the scanner to perform the scanning operation on the second network using the IP address of the user equipment is done in response to the first network receiving an update to the lookup table from the second network indicating that the user equipment has been attached to the second network.

Clause 14. The non-transitory computer-readable media of any of clauses 10-13, wherein prompting the scanner to perform the scanning operation on the second network using the IP address of the user equipment is done in response to a period of time elapsing between a prior scanning operation and the scanning operation.

Clause 15. The non-transitory computer-readable media of any of clauses 10-14, wherein the IP address is associated with an address space for IPv6 communication protocols.

Clause 16. The non-transitory computer-readable media of any of clauses 10-15, further comprising providing the results of the scanning operation to the second network.

Clause 17. The non-transitory computer-readable media of any of clauses 10-16, wherein the scanning operation comprises scanning the IP address to probe for vulnerabilities to determine a possible exploit.

Clause 18. The non-transitory computer-readable media of any of clauses 10-17, wherein the lookup table further comprises a geographic region of the user equipment, a geographic region of the second network, a date/time when the user equipment was assigned the IP address, and a media access control (MAC) address of the user equipment.

Clause 19. A mobile telecommunications network, comprising: a lookup table configured to receive information about one or more user equipment attached to an enterprise network, the information comprising an external Internet protocol (IP) address for each of the one or more user equipment provided by the enterprise network when the one or more user equipment is attached to the enterprise network; a scanner configured to perform an external vulnerability scan of at least one of the one or more user equipment attached to the enterprise network, wherein the external vulnerability scan comprises scanning the at least one of the one or more user equipment using the IP address to determine possible exploits; and a security monitor configured to receive results of the external vulnerability scan and to provide the results to the enterprise network.

Clause 20. The mobile telecommunications network of clause 19, wherein the information about the one or more user equipment attached to an enterprise network further comprises a geographic region of the one or more user equipment, a geographic region of the enterprise network, and a media access control (MAC) address of the one or more user equipment.

While the example clauses described above are described with respect to one particular implementation, it should be understood that, in the context of this document, the content of the example clauses can also be implemented via a method, device, system, computer-readable medium, and/or another implementation. Additionally, any of the examples A-S can be implemented alone or in combination with any other one or more of the examples A-S.

Conclusion

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:
   receiving, at a first network, an Internet protocol (IP) address of a user equipment attached to a second network;
   updating a lookup table, wherein the lookup table comprises the IP address of the user equipment, a geographic region of the user equipment, a geographic region of the second network, and a date/time when the user equipment was assigned the IP address;
   prompting a scanner to perform a scanning operation on the second network using the IP address of the user equipment;
   providing the scanner with the IP address of the user equipment from the lookup table; and
   receiving results of the scanning operation.

2. The method of claim 1, wherein the IP address of the user equipment is provided by a router servicing the second network.

3. The method of claim 2, wherein the router servicing the second network performs a neighbor discovery protocol to provide the IP address of the user equipment.

4. The method of claim 1, wherein prompting the scanner to perform the scanning operation on the second network using the IP address of the user equipment is done in response to the first network receiving an update to the lookup table from the second network indicating that the user equipment has been attached to the second network.

5. The method of claim 1, wherein prompting the scanner to perform the scanning operation on the second network using the IP address of the user equipment is done in response to a period of time elapsing between a prior scanning operation and the scanning operation.

6. The method of claim 1, wherein the IP address is associated with an address space for IPV6 communication protocols.

7. The method of claim 1, further comprising providing the results of the scanning operation to the second network.

8. The method of claim 1, wherein the scanning operation comprises scanning the IP address to probe for vulnerabilities to determine a possible exploit.

9. The method of claim 1, wherein the lookup table further comprises a media access control (MAC) address of the user equipment.

10. A non-transitory computer-readable media storing computer-executable instructions that, when executed by one or more processors, cause the one or more processors to perform operations comprising:
   receiving, at a first network, an Internet protocol (IP) address of a user equipment attached to a second network;
   updating a lookup table, wherein the lookup table comprises the IP address of the user equipment, a geographic region of the user equipment, a geographic region of the second network, and a date/time when the user equipment was assigned the IP address;
   prompting a scanner to perform a scanning operation on the second network using the IP address of the user equipment;
   providing the scanner with the IP address of the user equipment from the lookup table; and
   receiving results of the scanning operation.

11. The non-transitory computer-readable media of claim 10, wherein the IP address of the user equipment is provided by a router servicing the second network.

12. The non-transitory computer-readable media of claim 11, wherein the router servicing the second network performs a neighbor discovery protocol to provide the IP address of the user equipment.

13. The non-transitory computer-readable media of claim 10, wherein prompting the scanner to perform the scanning operation on the second network using the IP address of the user equipment is done in response to the first network receiving an update to the lookup table from the second network indicating that the user equipment has been attached to the second network.

14. The non-transitory computer-readable media of claim 10, wherein prompting the scanner to perform the scanning operation on the second network using the IP address of the user equipment is done in response to a period of time elapsing between a prior scanning operation and the scanning operation.

15. The non-transitory computer-readable media of claim 10, wherein the IP address is associated with an address space for IPv6 communication protocols.

16. The non-transitory computer-readable media of claim 10, further comprising providing the results of the scanning operation to the second network.

17. The non-transitory computer-readable media of claim 10, wherein the scanning operation comprises scanning the IP address to probe for vulnerabilities to determine a possible exploit.

18. The non-transitory computer-readable media of claim 10, wherein the lookup table further comprises a media access control (MAC) address of the user equipment.

19. A mobile telecommunications network, comprising:
   a lookup table configured to receive information about one or more user equipment attached to an enterprise network, the information comprising an external Internet protocol (IP) address for each of the one or more user equipment provided by the enterprise network when the one or more user equipment is attached to the enterprise network, wherein the lookup table further comprises a geographic region of the one or more user equipment, a geographic region of the enterprise network, and a date/time when the one or more user equipment was assigned the IP address;
   a scanner configured to perform an external vulnerability scan of at least one of the one or more user equipment attached to the enterprise network, wherein the external vulnerability scan comprises scanning the at least one of the one or more user equipment using the IP address to determine possible exploits; and
   a security monitor configured to receive results of the external vulnerability scan and to provide the results to the enterprise network.

20. The mobile telecommunications network of claim 19, wherein the lookup table further comprises a media access control (MAC) address of the one or more user equipment.

* * * * *